United States Patent [19]
Dolin, Jr.

[11] Patent Number: 5,519,878
[45] Date of Patent: May 21, 1996

[54] SYSTEM FOR INSTALLING AND CONFIGURING (GROUPING AND NODE ADDRESS ASSIGNMENT) HOUSEHOLD DEVICES IN AN AUTOMATED ENVIRONMENT

[75] Inventor: Robert A. Dolin, Jr., Menlo Park, Calif.

[73] Assignee: Echelon Corporation, Del.

[21] Appl. No.: 276,090

[22] Filed: Jul. 15, 1994

Related U.S. Application Data

[63] Continuation of Ser. No. 852,325, Mar. 18, 1992, abandoned.
[51] Int. Cl.$^6$ .............................. G06F 13/00; H04Q 7/00
[52] U.S. Cl. ...................... 395/800; 395/829; 395/200.1; 364/255.8; 364/242.96
[58] Field of Search .................................. 395/800, 829, 395/200.1

[56] References Cited

U.S. PATENT DOCUMENTS

| | | | |
|---|---|---|---|
| 4,217,646 | 8/1980 | Cattagirone et al. | 364/493 |
| 4,641,347 | 2/1987 | Clark et al. | 380/3 |
| 4,685,702 | 8/1987 | Kazultaru | 283/81 |
| 4,829,568 | 5/1989 | Clark et al. | 380/23 |
| 4,864,112 | 9/1989 | Imai et al. | 235/463 |
| 4,907,224 | 3/1990 | Scoles et al. | 370/85.2 |
| 4,916,441 | 4/1990 | Gombrich | 340/712 |
| 4,918,690 | 4/1990 | Markkula, Jr. et al. | 370/94 |
| 4,936,693 | 6/1990 | Ohsawa | 400/104 |
| 4,975,905 | 12/1990 | Mann et al. | 370/85.1 |
| 5,034,945 | 7/1991 | Kimoto et al. | 370/13.1 |
| 5,061,916 | 10/1991 | French et al. | 340/522 |
| 5,128,855 | 7/1992 | Hilber et al. | 364/132 |
| 5,150,464 | 9/1992 | Sidhu et al. | 395/200 |
| 5,198,644 | 3/1993 | Pfeiffer et al. | 235/383 |

OTHER PUBLICATIONS

Kishimoto et al., "Configuration and Performance of a home bus using slotted flag control"; IEEE pp. 584–592 Transactions on Consumer Electronics, vol. CE32, No. 3, Aug. 1986.

(List continued on next page.)

Primary Examiner—Krisna Lim
Attorney, Agent, or Firm—Blakely, Sokoloff, Taylor & Zafman

[57] ABSTRACT

An apparatus and method for network node identification and network configuration. Prior to physical installation, a first node of a network is communicated with by a dedicated apparatus wherein the first node is requested to transmit a first unique identifier for the node to the apparatus. The apparatus then stores the first unique identifier received from the first node, and generates the first unique identifier on a medium (e.g. a label). This first unique identifier may be represented on the medium in a coded format. In one embodiment, the coded format is a code 39 bar code and the medium is an adhesive label. The labels obtained from querying the nodes prior to physical installation may be affixed to a floor plan of a networking system during installation, indicating each node's physical placement in that system. Each of the identifiers may then later be automatically read by an automated apparatus for network configuration. This apparatus (e.g. a general purpose programmed computer system) displays a physical layout of the networking system. This apparatus automatically reads the labels comprising the unique identifiers of nodes and assigns the identifiers to the respective positions on the physical layout of the networking system according to the position of the nodes on the diagram. Each of the codes, in a preferred embodiment, are associated with the physical placement of node in the networking system by a floor plan displayed on a display device (e.g. a CRT). Then, nodes in the system may be configured (by grouping, network address assignment, etc. . . . ) to communicate with other nodes in the network via the communication medium which is represented on the floor plan.

27 Claims, 8 Drawing Sheets

OTHER PUBLICATIONS

Hunt et al; "Electrical Energy Monitoring and Control System for Home"; IEEE Trans, vol. CE–32, No. 3, Aug. 1986 pp. 578–583.

Stauffer et al; "Smart Enabling System for Home Automation" IEEE Trans, vol. 37, No. 2, May 1991.

"Home, Smart Home"; Middle East Electricity 1988, vol. 12, No. 3, pp. 16–17 & 20.

"Building the Intelligent Home"; EPRI Journal Jun. 1991, pp. 5–15.

"Detroit '88: Driver–Friendly Innovations", Ronald K. Jurgen, IEEE Spectrun, Dec. 1987, vol. 24, No. 12, pp. 53–57.

"Coming From Detroit: Networks On Wheels", Ronald K. Jurgen, IEEE Spectrum, Jun. 1986, vol. 23, No. 6, pp. 53–59.

"Time Critical Communication Networks: Field Buses", P. Pleinevaux, J. D. Decotignie, IEEE Network, May 1988, vol. 2, No. 3, pp. 55–63.

"Appendix A—Draft International Standard ISO/DIS 7498: Information Processing Systems–Open Systems Interconnection–Basic Reference Model", (Apr. 1982), Computer Network Architectures–Computer Science Press, 1988 Anton Meijer & Paul Peeters, pp. 291–370.

"Local Area Network Architectures", Addision Wesley, 1988, pp. 23–28, 75.

SYSTEM FOR INSTALLING AND CONFIGURING (GROUPING AND NODE ADDRESS ASSIGNMENT) HOUSEHOLD DEVICES IN AN AUTOMATED ENVIRONMENT

This is a continuation of application Ser. No. 07/852,325, filed Mar. 18, 1992, now abandoned.

BACKGROUND OF THE INVENTION

1. Field of the Invention

The present invention relates to networking systems. More particularly, this invention relates to a method and apparatus for determining the unique address of a node in a networking system having distributed intelligence.

2. Background Information

It has become quite common in the computing industry to transfer data and commands between data processing devices such as computers, printers, displays, terminals, and other devices which are typically known as "nodes" or network resources. Interconnection of computers and other devices has been accomplished with networks, such networks which include local area networks (LAN's). LAN's use a variety of communication techniques such as carrier sense multiple access with collision detection (CSMA/CD) protocols for communication between nodes in the LAN. CSMA/CD is otherwise known as the ISO 8802 Part 802.3 of the IEEE 802 standard.

In addition to networking of computers, local area networks have been forecast as being used for many applications, such as eliminating costly and complicated wiring in many applications. This includes, among other things, their use in automotive, domestic, aviation and ship-borne applications. This type of network is known as the "field bus." (See David Hutchinson, *Local Network Architectures*, Addison Wesley, 1988, p. 75; P. Pleinevaux & J. D. Decotignie, "Time Critical Communication Networks: Field Buses", IEE Network Vol. 2, No. 3 pp. 55–63, May 1988; R. Jurgen, "Coming From Detroit: Networks on Wheels," IEEE Spectrum, Vol. 23, No. 6, pp. 53–59, June 1986; and R. Jurgen, "Detroit '88: Driver Friendly," IEEE Spectrum, Vol. 24, No. 12, pp. 53–57, December 1987). In other words, each device in a particular application may include a unit which provides communication and unique identification for the device to send and receive messages passed over a communications medium. Therefore, instead of expensive wiring and the entailing maintenance, cost, weight, and other problems associated with multiple communications media in an application such as the wiring in an automobile, a single communication medium may be used upon which messages between devices may be passed. Another example is that of the home management system. This is described and discussed in more detail with reference to FIG. 1.

Figure 1:
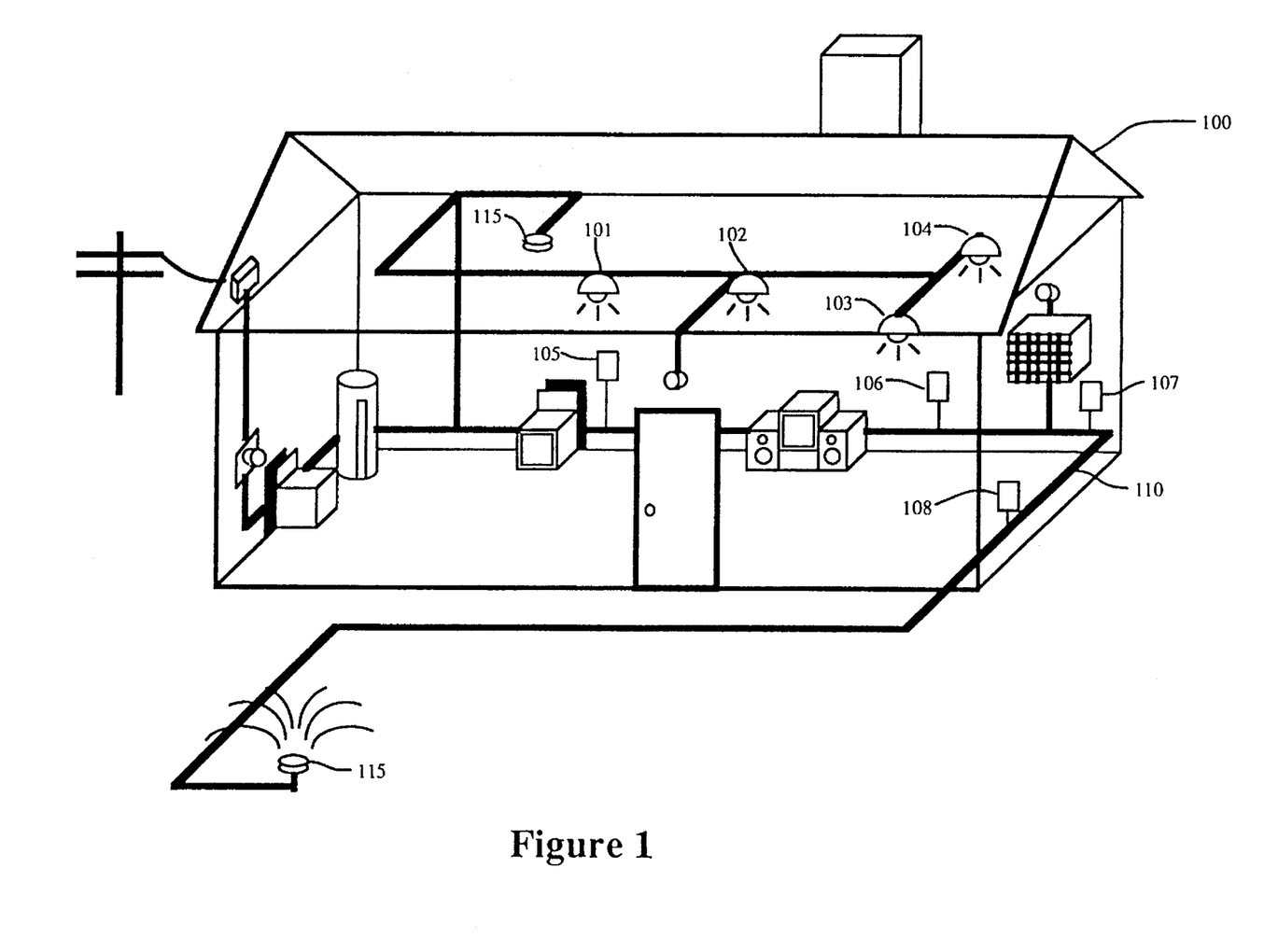
FIG. 1 shows an example of a distributed intelligence control network in a home.

As shown in FIG. 1, a house such as 100 shown in FIG. 1 may have a number of devices in it which are coupled via a single communications medium 110. 110 may be a twisted-pair wire, a coaxial, or a fiber optic communications medium such as used in Ethernet or other similar communications technology using a bus standard. Some systems, such as the "X-10" system sold by Leviton, BSR or Tandy Corporation, use normal house wiring as communication medium 110. In this environment, given devices and switches may have intelligence so that if a particular switch is actuated, that switch will send a signal on communication medium 110 to cause a particular device to perform a predefined operation. For instance, lights 101, 102, 103, and 104, may be actuated by any or all of switches 105, 106, 107, or 108. For instance, if switch 105 is thrown to a "closed" position, light 101 may be illuminated. Alternatively, 105 may illuminate lights 101 and 102, or it may illuminate all of lights 101–104. This use may be important in a security or alarm system, or a situation where one master light switch is desired.

As can be appreciated from viewing house 100 in FIG. 1, the physical placement of various switches and devices in the system is important. In other words, it is important to know that certain devices located in one region of a house may only act upon devices located in that region. For instance, switch 105 which is located near light 101 may be configured to operate light 101. In contrast, switch 105 will not operate light 103 which is located at the other side of the house. Because control of light 101 is accomplished via communication with circuitry in switch 105 across medium 110, it is important that each of the devices have a unique identification associated with them in order to distinguish one device from another. In hardwired systems, this is not necessary because, in this example, switches would be directly wired only to the devices that they control. Hardwired systems have the disadvantage that the relationships between switches or controls and devices cannot be changed without costly rewiring. Distributed intelligence control networking systems do not have these disadvantages.

It is the motivation of wire savings and of flexibility that is causing a movement away from hardwired systems and towards distributed control. To allow communication between nodes in such a system, each node must have a unique address or other identifier associated with it. With the increase in the popularity of distributed control has come the understanding of the need for a better, simpler way to assign addresses correctly to each node during the installation process to enable communication between nodes.

Many systems today depend on an installer correctly setting dip switches, rotary switches, or typing in a long number in the case of Ethernet to set a unique network address for a node. All these methods are subject to human error. These errors lead to costly repairs of the installation involving finding the two or three nodes out of hundreds which have the same address.

U.S. Pat. No. 4,918,690, Markkula, et al. entitled "Network and Intelligent Cell for Providing Sensing, Bidirectional Communications and Control" (hereinafter the '690 patent) references the concept of a unique identifier (ID) in each node to simplify addressing. The application describes an invention for automatically getting each unique ID and associating the ID with the specific node in the system which has that ID. This is accomplished without the setting of switches or typing of numbers.

Addressing and node identification are a necessary part of any network communication. A unique identification of a device may reside at the network layer of the open system interconnections model (ISO/OSI). The ISO/OSI model is shown in more detail with reference to Table 1 below:

TABLE 1

| Level # | Layer |
|---|---|
| 7 | Application Layer |
| 6 | Presentation Layer |
| 5 | Session Layer |
| 4 | Transport Layer |
| 3 | Network Layer |
| 2 | Data Link Layer |

TABLE 1-continued

| Level # | Layer |
| --- | --- |
| 1 | Physical Layer |

The reference model describes a layered approach to communication architectures, wherein seven levels are defined. Each of these levels has certain functions. The physical layer is concerned with the electrical and mechanical means of transmitting and receiving information using a communications medium. It defines the details of connecting cables and processing digital data signals. The data link layer is responsible for managing the integrity of information sent between two points. The network layer has the responsibility of ensuring that information is routed correctly through the communication medium to the nodes it is intended for. Until nodes have a correct network address, the upper layers in the application will not function. The transport layer is responsible for shielding the upper layers in the ISO/OSI model from the specific details used by the lower layers of the ISO/OSI model. The transport layer is a network independent service between the application layers which are found above it. It provides end-to-end acknowledgement and duplicate detection. The session layer provides a means for establishing a communication session between two application processes which police the session and terminate it in an orderly fashion. It provides checkpoints to which a return can be made in the case of a failure. The presentation layer provides translation facilities for application entities using different formats. Finally, the highest layer, the application layer performs all the operations which are necessary for interfacing with the resident application system in a computer, such as the operating system or other high level program. A detailed discussion of the ISO/OSI model may be found in the reference entitled *ISO/TC97: Information Processing System, Open Systems Interconnection—Basic Reference Model, Draft International Standard ICO/DIS* 7498 by the International Standards Organization, published in April 1982 and is reproduced as Appendix A in Anton Meijer and Paul Peters, *Computer Network Architectures*, Computer Science Press (1982). A discussion of the ISO/OSI model may also be found in David Hutchinson, *Local Area Network Architectures*, Addison Wesley (1988), at pages 23–28.

Each of the devices in a system such as 101–104, and 105–108 have unique identifiers associated with them in order to distinguish one device from another which are coupled to medium 110. These unique identifiers are typically stored in a ROM or other static device in the circuitry which handles communication among the various devices coupled to medium 110. Although internally each of the devices has a unique identifier associated with it, the unique identifier is not usually physically evident on the exterior of the device in the system. Therefore, at configuration time, it is difficult for an installer to determine the identifier associated with a particular device. Because the physical placement of a switch such as 105 may be important to control a specific light such as 101 which is physically located at a particular location, and its unique identifier will not be readily apparent to a human installer, it is difficult to configure a distributed intelligence control system. In addition, once devices am installed in an environment such as house 100, the identifying information may need to be updated in particular devices at a later time to control other units according to user requirements. This is also important for periodic maintenance. In summary, there are currently no means for providing external physical identification of devices in a networking system such as 100.

SUMMARY AND OBJECTS OF THE INVENTION

In view of the limitations of certain prior art systems, it is an object of the present invention to provide an apparatus for externally determining the unique identifier for a device in a distributed intelligence control network.

It is a further object of the present invention to provide a method and apparatus for reconfiguring devices once they have been installed in a distributed intelligence control network.

These and other objects of the invention are provided for by a device for communicating with a first node of a network wherein the first node comprises a means for storing a first unique identifier and a coupling means for communicating. The device comprises a means for coupling with the coupling means of the first node and provides communication with the first node. Further, the device comprises a means for storing the first unique identifier received from the first node, and a means for displaying the first unique identifier in a coded format. In a preferred embodiment, the coded format is a code 39 bar code and is printed on an adhesive label. The labels obtained from nodes may be affixed to a paper floor plan of a networking system, indicating each nodes' physical placement in that system. Each of the bar codes may then be read by an apparatus for configuring a networking system. This apparatus comprises a means for displaying a physical layout of the networking system. It also comprises a means for reading a bar code comprising a first unique identifier of a first node and a means for associating a first position on the physical layout of the networking system with the first unique identifier. Each of the bar codes, in a preferred embodiment, are associated with the physical placement of node in the networking system by a floor plan shown on a cathode ray tube display. Then, each of the nodes may be associated with their physical locations by communicating across a communication medium.

BRIEF DESCRIPTION OF DRAWINGS

The present invention is illustrated by way of example and not limitation in the figures of the accompanying, in which like references indicate similar elements and in which.

DETAILED DESCRIPTION OF THE PREFERRED EMBODIMENT

A network node identification method and apparatus is described. In the following description, for the purposes of explanation, specific formats, circuitry, signals, and applications are set forth in order to provide a thorough understanding of the present invention. It will be apparent to one skilled in the art, however, that the present invention may be practiced without these specific details. In other instances, well known circuits and devices are shown in block diagram form in order to not unnecessarily obscure the present invention.

Figure 2:
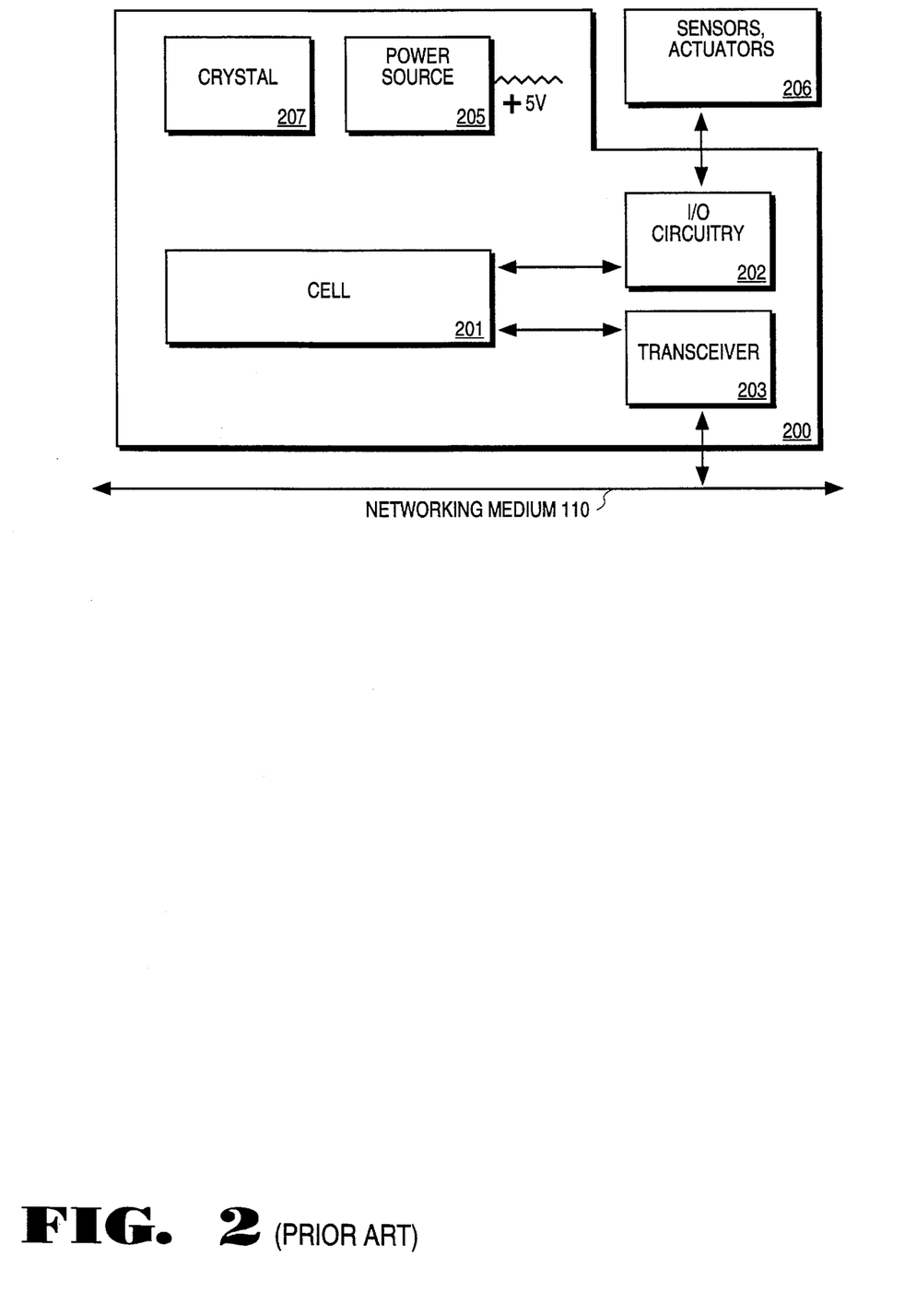
FIG. 2 shows the circuitry used for transmission and reception of messages on the medium shown in FIG. 1.

FIG. 2 shows a circuitry comprising the "intelligent" portion of each of the devices such as 101–108 as described with reference to FIG. 1. In such a system, circuitry 200 comprises several components such as cell 201, input/output (I/O) circuitry 202, a transceiver 203, and memory 204. 200 is generally referred to as a "node" in the remainder of this application A more detailed description of transceiver unit 203, I/O circuitry 202 and cell 201 is found in the '690 patent which is assigned to the assignee of the present invention. Node 200 will also comprise a power source 205 for supplying power to all the circuitry contained within 200, and a crystal or ceramic resonator for stable timing. Further, circuitry 200 is coupled to communications medium 110 as discussed in FIG. 1 via transceiver 203. This coupling is described in more detail in the '690 patent. Further, I/O circuitry 202 is coupled to certain sensors and actuators 206 which provide sensing and activation of circuitry external to 200. This provides the capability for sensing the states of certain switches, sensors, or other devices which information may be passed along onto communication medium 110. This also provides the capability to operate certain devices, such as electrically operated furnace dampers, or other electrical or electromechanical devices.

For instance, sensors or actuators 206 may include certain switches such as 105–108 shown in FIG. 1. Therefore, when switches are closed, I/O circuitry 202 may detect this state change, and pass the information along to cell 201, which then transmits that information using transceiver 203 onto communications medium 110. This thereby controls certain lights and/or other devices that are present in house 100 shown in FIG. 1. In another example, sensors or actuators 206 may include heat sensors for detecting temperature changes in a heating system, or sensors for detecting smoke and/or fire such as 115 shown in FIG. 1. As mentioned previously, the unique address of another node containing, for instance, an alarm unit such as a siren or warning lights, may be programmed into circuitry 200 of 115, such that when a fire is detected, certain other units in the network are alerted. In addition, in a heating system, wherein certain temperature changes are detected, other units in the networking system may be alerted to close or open specific dampers in the heating system for environmental control.

In addition to sensors in 206, 206 may also include certain actuators or relays for causing certain functions to take effect. These may include solenoids for control or operation of certain devices such as heating system dampers, electrically controlled door locks, or valves for lawn sprinklers such as 115 shown in FIG. 1. This may also include relays for switching of devices such as lights, alarms, or other electrical devices. As was described in the '690 patent, given cells are assigned either listener or announcer functions. This determines whether they act as units which send signals onto communications medium 110, or units which receive signals from communications medium 110. This function is predefined either at installation time, or at a time of manufacture. The embedding of unique ID's within each cell or cell such as 201 to allow unique identification is discussed in more detail below.

Figure 3:
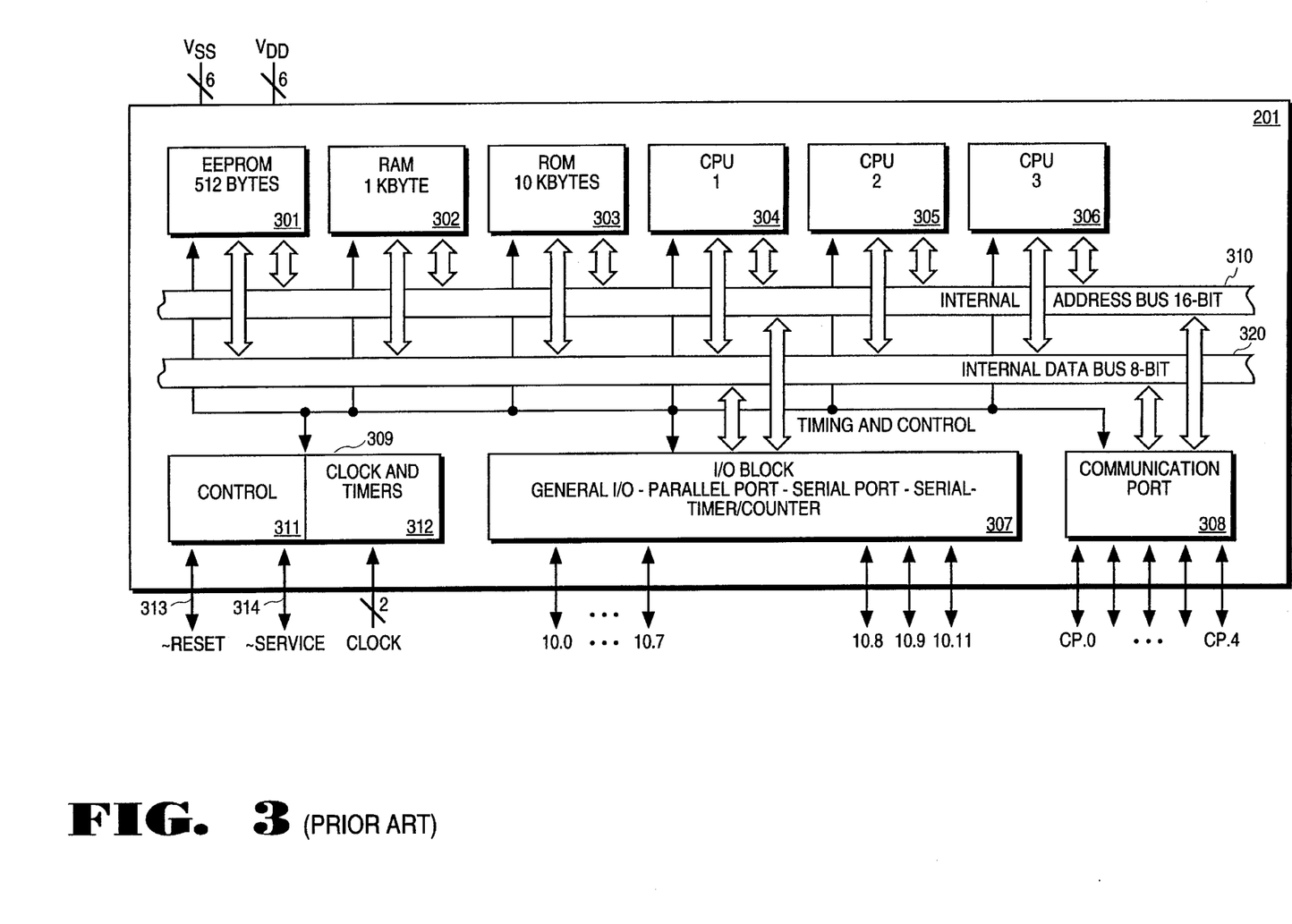
FIG. 3 shows the internal architecture of a cell used in the preferred embodiment.

A more detailed representation of cell 201 is shown and discussed with reference to FIG. 3. Cell 201 comprises three central processing units 304, 305, and 306 which are used for processing and handling various types of data. Cell 201 is implemented on a single LSI (large-scale integrated) chip using well-known LSI manufacturing techniques. It will be appreciated by one skilled in the art, however, that the circuitry contained within 201 may be implemented using other techniques, such as discrete hardware devices, with the corresponding advantages/disadvantages offered by those technologies. CPU 304 is known as the media access control processor (MAC) which distinguishes between data and noise being transmitted on networking medium 110 shown in FIG. 1. CPU 305 is known as the network processor (NP) and handles various packets which are embedded according to the ISO/OSI networking model discussed in the background above. CPU 306 is known as the applications processor (AP) and provides communication and control for the applications layer of the OSI model within networking system 100. Cell 201 comprises a 16-bit internal address bus 310 for communication between central processing units 304–306, and for retrieval of data from memories 301–303 which are discussed below. It also provides communication between the various input/output and communication circuitry 307 and 308 within cell 201. Cell 201 has an internal 8-bit data bus 320 which also provides communication of data between the various units within 201.

Cell 201 has three internal memories 301, 302, and 303. Cell 201 comprises a read only memory (ROM) 303 approximately 10 kilobytes in length which is used for embedding a static operating system for unit 303. This includes a communication protocol, schedules, and input/output (I/O) routines. It may also include specific functions directed towards the circuitry contained in 206 such as for a light switch or an electromechanical device such as an electrically operated furnace damper. Further, cell 201 comprises an electrically erasable programmable read only memory (EEPROM) 301 which is 512 bytes in length and is used for storing configuration information determined at network installation time. The unique 48-bit node ID of the cell is stored in memory 301 in locations that may only be written at chip manufacturing time. The 48-bit node ID provides a unique node ID for approximately 300 million million ($2^{48}$)devices, and therefore provides a means for uniquely identifying the maximum possible number of cells which may ever exist. This provides a unique ID for any node which would be present in any system 100, or any cell which may be added to system 100 at a later time. Also, cell 201 comprises random access memory (RAM) 302 which is one kilobyte in length and is used for the storage of temporary and other variables within cell 201 during normal operation.

In addition to memory and central processing units, cell 201 includes various ports including a communication port 308 which provides five signal lines (CP.0–CP.4) of communication with external units for configuration of cell 201. This allows certain information to be accessed directly from cell 201, and configuration information to be loaded directly into cell 201. Transceiver 203 is coupled to these lines. 201 includes an input/output block 307 which provides communication between various external devices and various analog devices coupled to 206 as shown in FIG. 2. The input/output block provides for a variety of I/O configurations including a parallel port and serial port as well as a timer/counter within cell 201. The parallel port includes eight input/output lines plus three control lines (10.0–10.11) and the serial port includes three input lines (10.8–10.10).

Cell 201 also includes a service block 309 which provides for resetting configuration information and other servicing of cell 201. 309 is comprised of two blocks: control block 311; and the clock/timer block 312. Control block 311 has two input/output lines which include a reset line 314 which may be driven low by an external unit in order to reset configuration information contained in cell 201. Service line 314 is provided so that, when grounded, cell 201 may be reconfigured and information may be provided through communication port 308. 309 further comprises clock/timer 312 which is used for providing clocking information to cell 201 via crystal 207 referred to in FIG. 2 above.

As mentioned above, nodes comprising cells such as 201 include a 48-bit node ID which uniquely identifies each cell in a system such as 100. This information is obtainable by issuing certain commands to the node through communications medium 110 or an appropriate port such as 308 which is directly connected to the node. Also as mentioned above, the node ID is assigned to the node at time of manufacture and it is believed that the 48-bit unique node ID will provide unique addresses for all possible cells which may be manufactured in the foreseeable future. Of course, it would be obvious to one skilled in the art, that either more or less numbers of bits may be used to represent the node ID along with the corresponding advantages and disadvantages associated with various numbers of bits used to represent a unique identifier.

In addition to the 48-bit unique node ID, a node may have several types of addresses associated with it. Specifically, in the preferred embodiment, a node may have two other unique addresses associated with it which are unique for the system within which the node resides. This allows various subsets of nodes to be defined which have predetermined meanings, such as all those devices operating in a particular area or a room, or all those input devices associated with certain output devices. Of course, this is only one example and it will be obvious to one skilled in the art that many other subset of nodes may be defined at the user's or the installer's choosing. In addition, because a relatively small subset of the total $2^{48}$ possible number of nodes manufactured typically operates within a given application such as a building or house, it may be convenient to associate with the node a "network address" which uses less than 48 bits. This may be useful because the assignment of a network's address containing fewer bits will take up less traffic on communication medium 110 for transmitting information between nodes while still maintaining unique values for every device on the particular network. Additionally, shorter addresses simplify the routing of packets through the network. Therefore, a means for assigning an alternative unique address or network address is required.

The present invention provides for a hierarchical address structure and supports three basic address types:

1. (domain, subnet, node number);
2. (domain, subnet, node ID); and
3. (domain, group).

Address types 1 and 3 (above) may be assigned to a node through appropriate requests on the network. For example, a request LON_NM_QUERY_ID is provided to cause a node or a set of nodes to provide their 48-bit node ID's. A request LON_NM_UPDATE_DOMAIN is provided in the system of the preferred embodiment to cause a node to join a given domain or change a domain for a configured cell. A request LON_NM_ADD_ADDR provides the cause a node to become a member of a group (update the address table). A node may be assigned multiple addresses. In addition to its node ID, a node in a network of the preferred embodiment is typically assigned one address of address type 1 (domain, subnet, node) and zero or more addresses of address type 3 (domain, group). Nodes may belong to multiple domains and thus have multiple sets of addresses—one for each domain.

One way that these addresses may be assigned to the nodes is provided by a service pin on each node which, when grounded, will cause the node to provide certain information to the network or a device connected directly to the node. This may be known as a service pin and may be structured such as that shown in FIG. 4. The service pin may also be used to allow the system installer to configure and reconfigure the node with configuration and network parameters in order to change information contained within EEPROM 301 shown in FIG. 3. As mentioned previously, this area was used for storing the various address information which was discussed above. A pad (or other sensing means) 402 and a light emitting diode (LED) or other indication means 403 are coupled with a service pin 314 of node 201. Service pin 314 is a bidirectional I/O pin which is polled and actuated by code in ROM 303 of node 201. During normal operations, LED 403 is normally off. When diagnostic code in the ROM detects an error condition in the node, the LED 403 is illuminated continuously. When node 201 has not yet been configured, LED 403 flashes.

Service pin 314 may be grounded by grounding pad 402. Pad 402 may be grounded by any of a plurality of common devices. For example, pad 402 may be grounded by actuation of a button, touching the pad with a screw driver blade, or driving a line to ground. When the pad 402 is grounded, the node sends out a message on the network broadcasting its 48-bit node ID. As seen with reference to FIG. 4 the preferred embodiment provides a signal line 314 to be used as the service pin. Service pin 314 is coupled to control block 311 as shown in FIG. 3.

Using the above-described circuit, nodes are more readily identified and may be more readily configured. Further, the circuit allows ready identification of nodes in the network which are either malfunctioning or which have not been configured.

Figure 4:
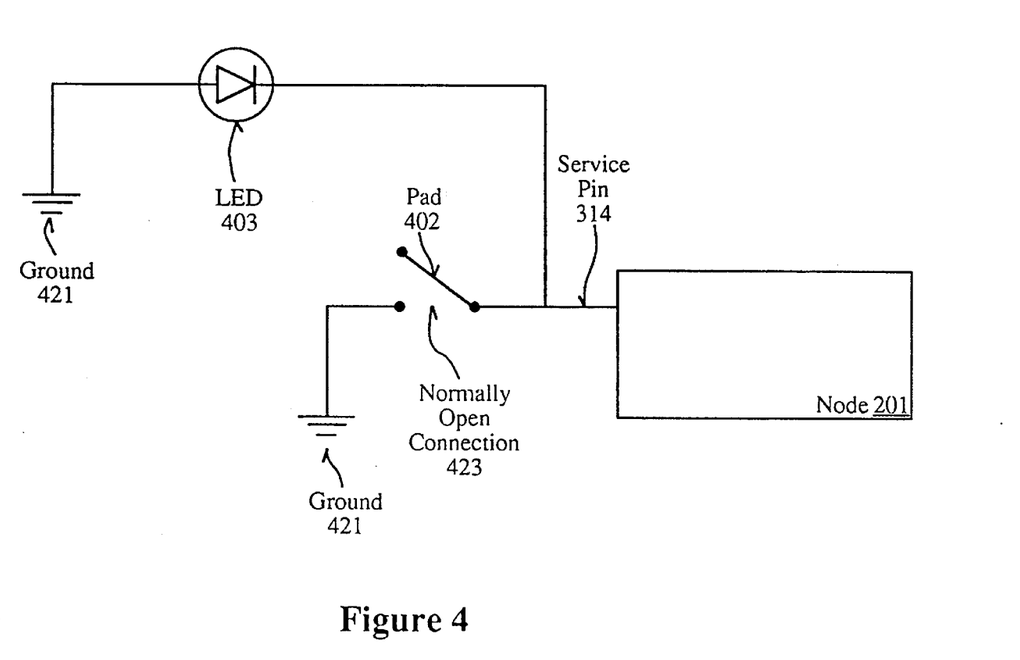
FIG. 4 shows the circuitry used in FIG. 3 for configuring a node in the network.

It may now be useful to briefly describe service pin 314, pad 402, and LED 403 of the preferred embodiment in greater detail. This description is made with reference to FIG. 4. In FIG. 4, node 201 is illustrated including service pin 314 which is coupled to a normally open connection 423 to ground 421. Pad 402, in the form of a signal line, is provided to close normally open connection 423. As described above, when the normally open connection 423 is closed (and, thus, service pin 314 is grounded), node 201 is caused to transmit a message onto the medium 110. Service pin 314 is also coupled to provide power to LED 303.

In operation, software executing in node 201 controls whether LED 403 is turned on or off by setting or clearing a flag. When LED 403 is turned off it indicates normal operation. When LED 403 is turned on it indicates the node is either unconfigured, no application has been loaded, or that some internal failure has been detected. When set, circuitry in the node pulses an open-drain output with no more than a 50% duty cycle which sinks 10 mA to drive LED 403. Node 201 further comprises an on-board pullup that normally pulls service pin 404 high between active-low LED pulses. When service pin 404 is forced low by an external connection to ground 421, the hardware detects this event.

Figure 5A:
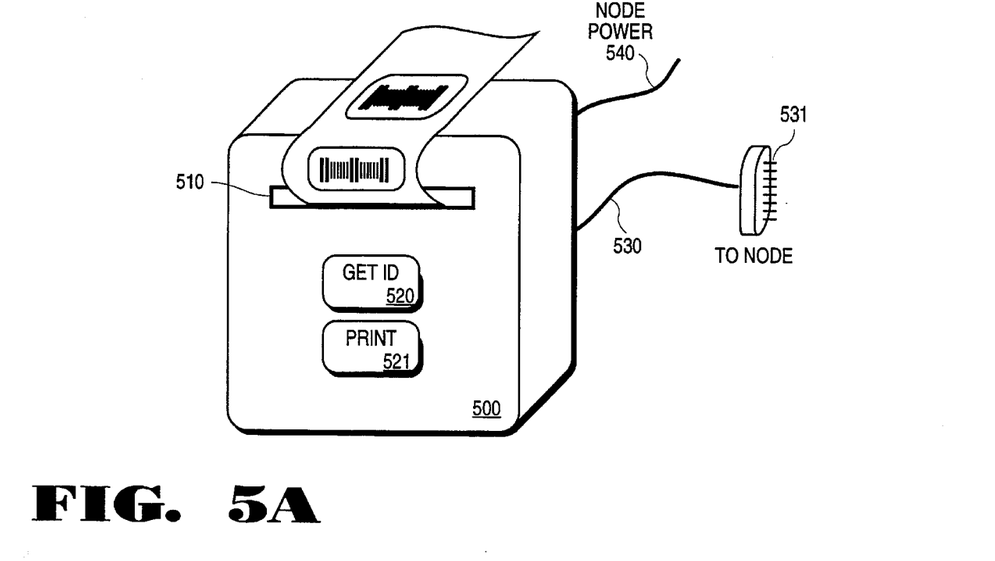
FIG. 5a shows an installation device used for configuring nodes in the network.
Figure 5B:
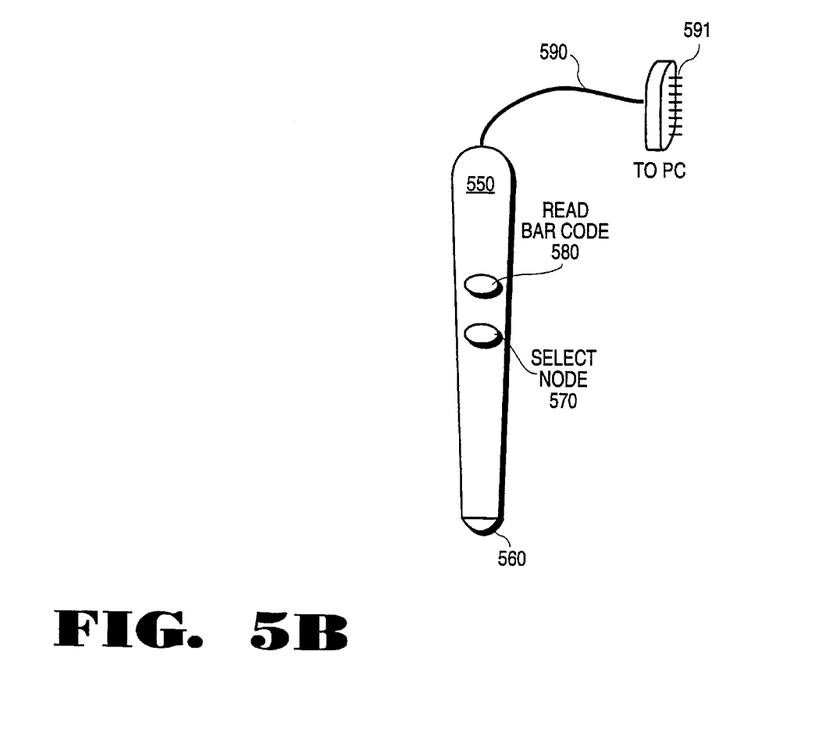
FIG. 5b shows a configuration unit used for configuring nodes in the network.

FIG. 5*a* and 5*b* shows configuration units 500 and 550 which may be used for node configuration and installation in the preferred embodiment by use of service pin 314. 500 is a node reader/printer which may be coupled to a node such as 201 at installation or manufacturing time. Installation device 500 comprises a printer 510, two buttons "Get ID" 520 and "Print" 521, and external lines 530 and 540. 530 couples to the node for communicating through communication port 308, and 540 provides power to the node. Unit 500 couples to a node such as 201 through line 530 and coupling connector 531. 531 is a DB9 or other suitable communications coupling connector, suitable for connecting to a communication port such as 308 shown in FIG. 3. This line is used for communicating with node 200 for querying information from the node and configuring the node. In addition, unit 500 comprises a momentary button 520 which is a single-pole-single-throw (SPST) type switch, and causes unit 500 to issue a node ID query command LON_NM_QUERY_ID to the node which is coupled to 531. Node 200 then responds with its node ID over line 530 to unit 500. Once this information is received over line 530 from the node, unit 500 retains the node ID in a memory located in the device until such time as the unit is deactivated or another node ID is retrieved.

Once the node ID has been retrieved from the node via the "Get ID" button 520 shown in FIG. 5*a*, the node ID may be printed out on a medium such as an adhesive label using printer 510. The node ID is represented on the label in a bar code or other similar format. The printing of the label is caused by depressing momentary switch 521 on unit 500 thus issuing the "Print" command to unit 500. Switch 521 is also an SPST switch and causes unit 500 to print out the node ID currently in unit 500's memory. Once switch 521 is depressed by the installer, printer 510 prints out the node ID on a suitable medium such as an adhesive label for later use by the installer. Printer 510 is an ink jet printer or another hard copy device which is suitable for printing a bar code. Once the node ID is obtained, further configuration of the node may be performed using unit 550, such as the setting of alternative network addresses, domains, groups, etc. of the node, by driving service pin 314 to ground.

Once information has been obtained using unit 500 in FIG. 5*a*, a device such as 550 may be used to configure nodes in the system. At installation time, 550 is used in conjunction with a personal computer or other similar device to store and configure zone and other network address information to correspond with each 48-bit unique node ID of each device in system 100. The programming device ensures that listener nodes are associated with their correct announcer nodes for network 100. Once bar codes are printed out for all nodes in the network using a unit such as 500, the bar codes for each of those units may be attached to a paper floor plan of a building to be configured, for instance, such as house 100 shown in FIG. 1. It can be appreciated by one skilled in the art that such a scheme may also be used for a wiring diagram in an automobile or other system using nodes such as 200 shown in FIG. 2.

As shown in FIG. 5*b*, unit 550 is used in the preferred embodiment for configuring nodes such as 200. 550 comprises a bar code reader/light pen device 560, and two buttons 570 and 580. 580 is an SPST switch which issues a code within unit 550 for reading a bar code. In the preferred embodiment, a bar code has previously been printed using a device such as 500. 550 is used to read bar codes off adhesive labels with node ID's on them which have been placed at specific physical locations on a paper floor plan. The installer then uses the paper floor plan to set zone and network address information for each node. Bar codes are read by sensor 560 located at one end of unit 550. Unit 550 further comprises a "Select Node" button 570 which is also an SPST switch. Button 520 issues a command through line 590 to an attached personal computer indicating that an area on a CRT has been selected. In this case, 550 acts as a light pen device and the user may select an area on a CRT screen. The CRT may display the floor plan of the system being configured. In this way, a device or area may be associated with a particular node ID. This allows the user or installer to then read a bar code using unit 550, and then associate that code with an area selected on a CRT screen by depressing switch 570. A computer display representation of a floor plan is shown in FIG. 6.

Figure 6:
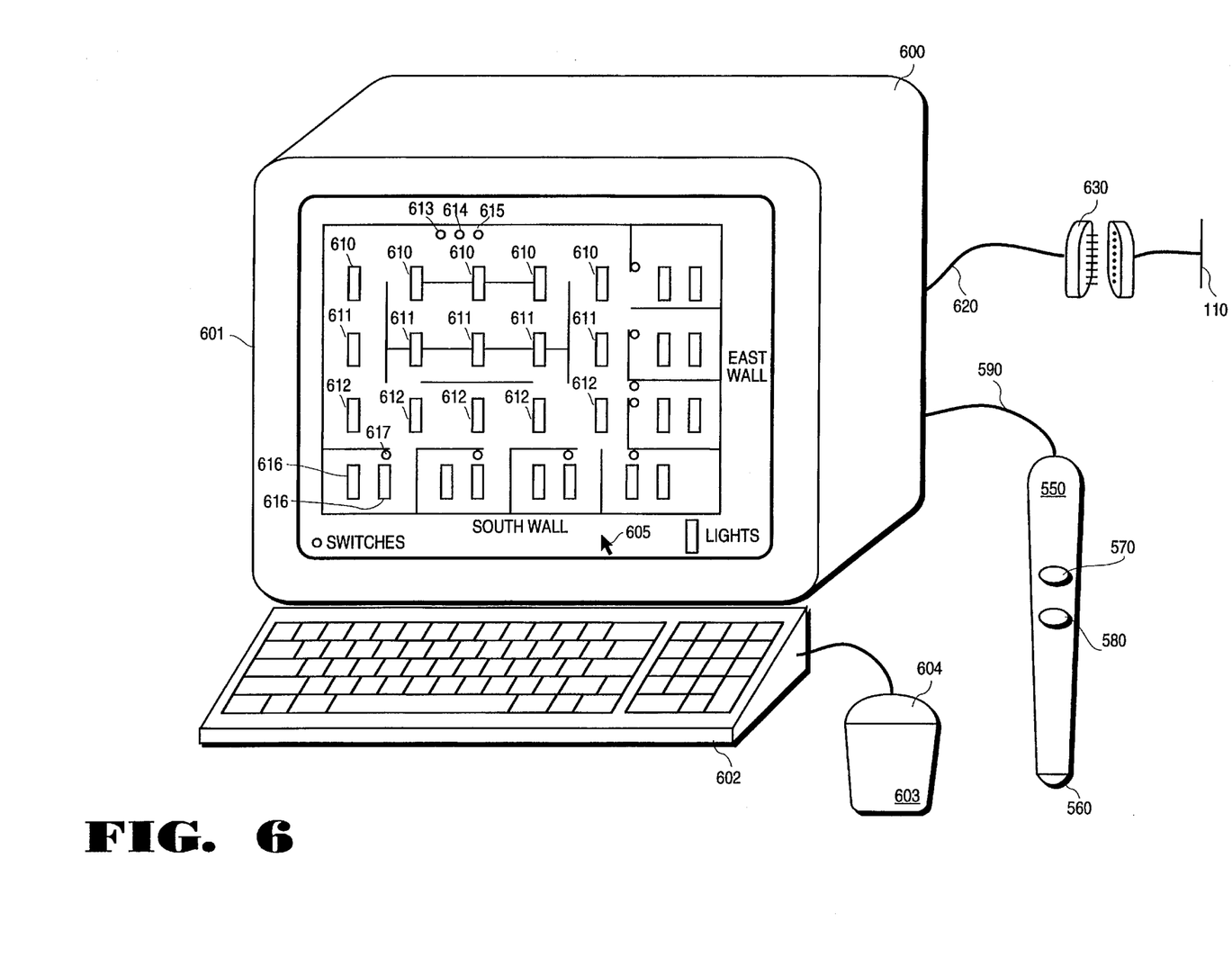
FIG. 6 shows devices used for configuring nodes in a network using a graphical representation of a floor plan.

As shown in FIG. 6, 550 may be coupled to computer system 600 using cable 590. As shown in FIG. 6, a floor plan of a lighting system in a building, for instance, may be displayed on a CRT monitor such as 601 of computer system 600 for configuration of numerous nodes in the system. 550 may be used to select zones or particular nodes on CRT screen 601, and node ID's from bar codes which have been placed on a paper floor plan. Computer system 600 further comprises a keyboard 602 for inputting information. Node ID's may be associated with the physical location of certain nodes on CRT screen 601. For instance, a user may depress the "Select node" button 570 on device 550. Then, with wand 550 operating as a light pen device, he may select one of the devices displayed on screen 601. As is shown in screen 601, the elongated shapes such as 610 show physical locations of lights on the floor plan. The circular gray shapes on CRT screen 601 such as 613 show switches which may be associated with the lights on the floor plan. The switches act as "announcer" devices and the lights act as "listener" devices in this example. Once the user has depressed button 570, he may then select a device displayed on CRT 601. For instance, the user may select a light switch graphically displayed as 613. Once this light switch has been selected, the user may then depress the "Read Bar Code" key 580 and use wand 550 as a bar code reader. The installer will then read the bar code containing the unique node ID off the paper floor plan in order to correspond with the physical location of switch 613 displayed on CRT 601. Of course, the printed adhesive bar code labels have already been affixed to the paper floor plan by the field installers and act as a guide to the operator of system 600. This allows field installers to use only the labels and paper floor plan when physically installing switches in the building. At a later time, a system configuration manager may use the paper floor plan to associate particular node ID's with the physical location of switches on the floor plan displayed on CRT 601. Automated assignment of zone and network information may then be carried out by personal computer system 600 using various configuration commands such as LON_NM_UPDATE_DOMAIN, LON_NM_ADD_ADDR, and LON_NM_QUERY_ID, among others.

For example, a user may wish to associate switch 613 as an announcer with a bank of lights 610 as listeners. Each of the lights 610 will be individually selected by depressing key 570, and each of their corresponding node ID's will be read by depressing 580 and reading the bar codes off each of the printed adhesive labels. Once lights 610 have been assigned their node ID's, and a switch such as 613 has been assigned its node ID, computer 600 may assign one zone or one area to nodes 610 and switch 613. Then, the activation of switch 613 may control lights 610. In a similar manner, switch 614 may be assigned to correspond with lights 611, and switch 615 may be assigned to correspond with lights 612. In addition, for individual rooms in the floor plan displayed on CRT 601, a switch such as 617 may be assigned to correspond with the lights in the room such as 616. Computer system 600 may be coupled to medium 110 as shown in FIG. 6 via line 620 and connector 630. After all of the node ID's have been assigned to each of the units shown on the floor plan, queries may be issued on medium 110 to determine the status of each of the nodes in the system. Remote assignment of network address, groups, domains, areas, and zones of nodes in the system may be performed remotely using the various commands such as LON_NM_QUERY_ID, LON_NM_UPDATE_DOMAIN, or LON_NM_ADD_ADDR. The various commands will then cause the appropriate configuration to take place.

In an alternative embodiment, 550 need not be used for selecting devices on the floor plan displayed on CRT 601. 550 may lack the "light pen" feature. In an alternative embodiment, a mouse or other input pointing device such as 603 shown in FIG. 6 may be used. A cursor such as 605 shown on CRT 601 may be controlled by mouse 603. Cursor 605 can be moved to "select" the appropriate area on CRT 601 for assignment of the node ID. In this alternative embodiment, 550 will only act as a bar code reader and not as an input light pen device. This is done by moving mouse 603 to control cursor 605, and "selecting" an area on CRT 601 by depressing a select button such as 604. The bar code for the device on the floor plan may then be read. In another alternative embodiment, cursor pointing keys and cursor selection keys on keyboard 602 may be used for moving 605 or selecting areas on CRT 601 so that nodes on the floor plan may be associated with the proper node ID's to be read by bar code reader 550.

It will be appreciated by one skilled in the art that many variations of the above-referenced schemes may be used for assigning node ID's to physical locations in a plan for a house or other system using the above-described techniques. For instance, instead of bar codes, node ID's may be printed using magnetic strip labels, punched labels or similar hard copy media capable of retaining the 48-bit unique node ID using appropriate hardware devices. The preferred embodiment uses a code 39 bar code which is a standard Department of Defense bar code in use since 1980. Because the preferred embodiment requires coding a 48-bit unique node ID, certain other bar codes presently in use such as the universal product code (UPC) are not practical. This is because the UPC code specifies the encoding and length of the code word. In the UPC code the only symbols that exist in the encoding scheme are the digits 0–9. Because there is a 48-bit number associated with the node ID, the UPC code will require approximately three sets of UPC codes in order to encode the entire 48-bit node ID. The current system requires 6 bytes or 12 hexadecimal digits to encode the 48-bit unique node number. Code 39 uses 44 symbols and does not restrict how long the entire code may be. Thus, code 39 is used in the preferred embodiment for representing the 12-digit hexadecimal number of the 48-bit unique node ID. Although code 39 is used in the preferred embodiment for printing on unit 500 and reading using unit 550, it will be appreciated by one skilled in the art that many other techniques may be used to print out the bar codes for the unique node ID's. Alternative embodiments may include the following three bar code schemes for encoding the 48-bit node ID:

1. Code-a-bar, in use in libraries and blood banks, which has 20 symbols:
2. Code 93, which has a 47-symbol set; and
3. Code 128, which has 105 distinct symbols. Code 39 is used in the preferred embodiment because it is in the most widespread use and readers and decoders for Code 39 are relatively inexpensive and plentiful. Of course, in other alternative embodiments using varying lengths of unique node ID's, varying formats of bar codes may be used, according to system requirements.

In another alternative embodiment, instead of an installer using device 500 shown in FIG. 5 to print the bar codes, it is anticipated that manufacturers may desire to print bar codes at the time of embedding unique node ID's in the non-volatile memory of each manufactured node. In this case, no unit 500 will be required, as bar code labels may be supplied along with nodes. The bar code labels may simply be removed from the package along with the corresponding device, and attached to the floor plan at the time of installation.

A summary of the process for performing network node identification and configuration operations for network nodes, such as those controlling household devices (e.g., light fixtures, sockets, etc.), in a networking system is illustrated with reference to process 700 of FIGS. 7a and 7b. This process may be especially useful for the configuration of an automated "smart house" as illustrated in FIG. 1, wherein a plurality of devices in the system are physically installed into fixed locations in a building, for example, wherein removal of the device and associated network nodes controlling the device is especially difficult after installation. For example, network intelligent cells for controlling light fixtures will typically be installed in a ceiling, wall or other location at the time of construction of a building, wherein access and subsequent direct communication with the device is extremely difficult, since it may require partial disassembly of the building in which the node and device are installed. Thus, the process is especially useful for obtaining the unique ID's pre-stored in each cell such as 201 to determine that cell's unique address, and later, perform configuration operations such as grouping, network address assignment and other functions as is described in U.S. Pat. No. 4,918,690, of Markkula, et al. without demolition of the surrounding structure of the building. Thus, using the installed power grid contained within the house such as 110 of FIG. 1, after installation, a network configuration manager may select nodes in the network for example, using a display such as 601 of FIG. 6, and associate those nodes with unique ID's obtained from each of the nodes with locations on the configuration device's display. In this way, the configuration devices, typically a personal computer or other intelligent device capable of retaining such information under control of a configuration manager, may communicate across the networking medium 110, and perform the configuration operations, as desired.

Figure 7A:
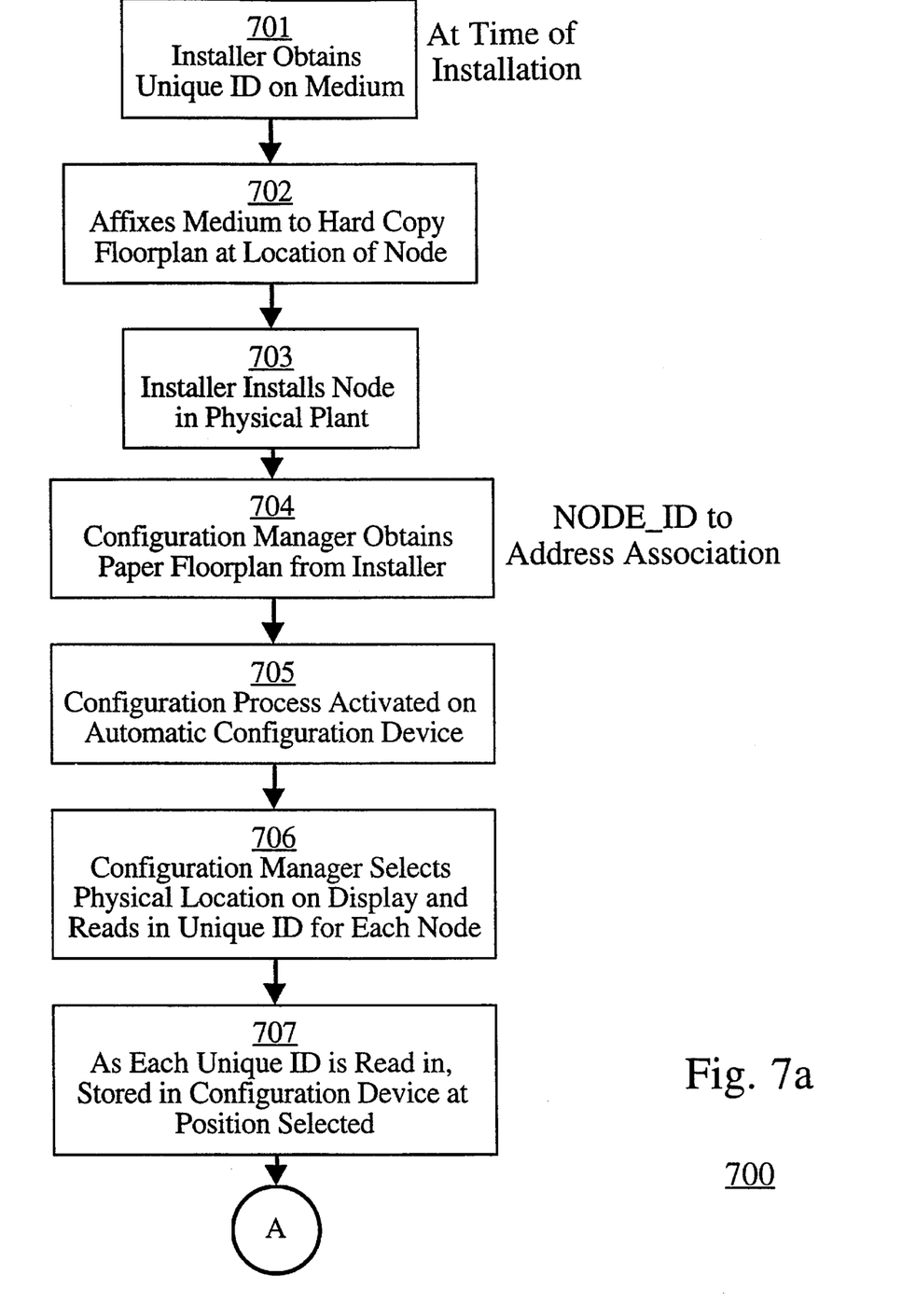
FIGS. 7a and 7b show a summary of a process used for installing devices and performing configuration operation of those devices, for example, in an automated "smart house" environment.
Figure 7B:
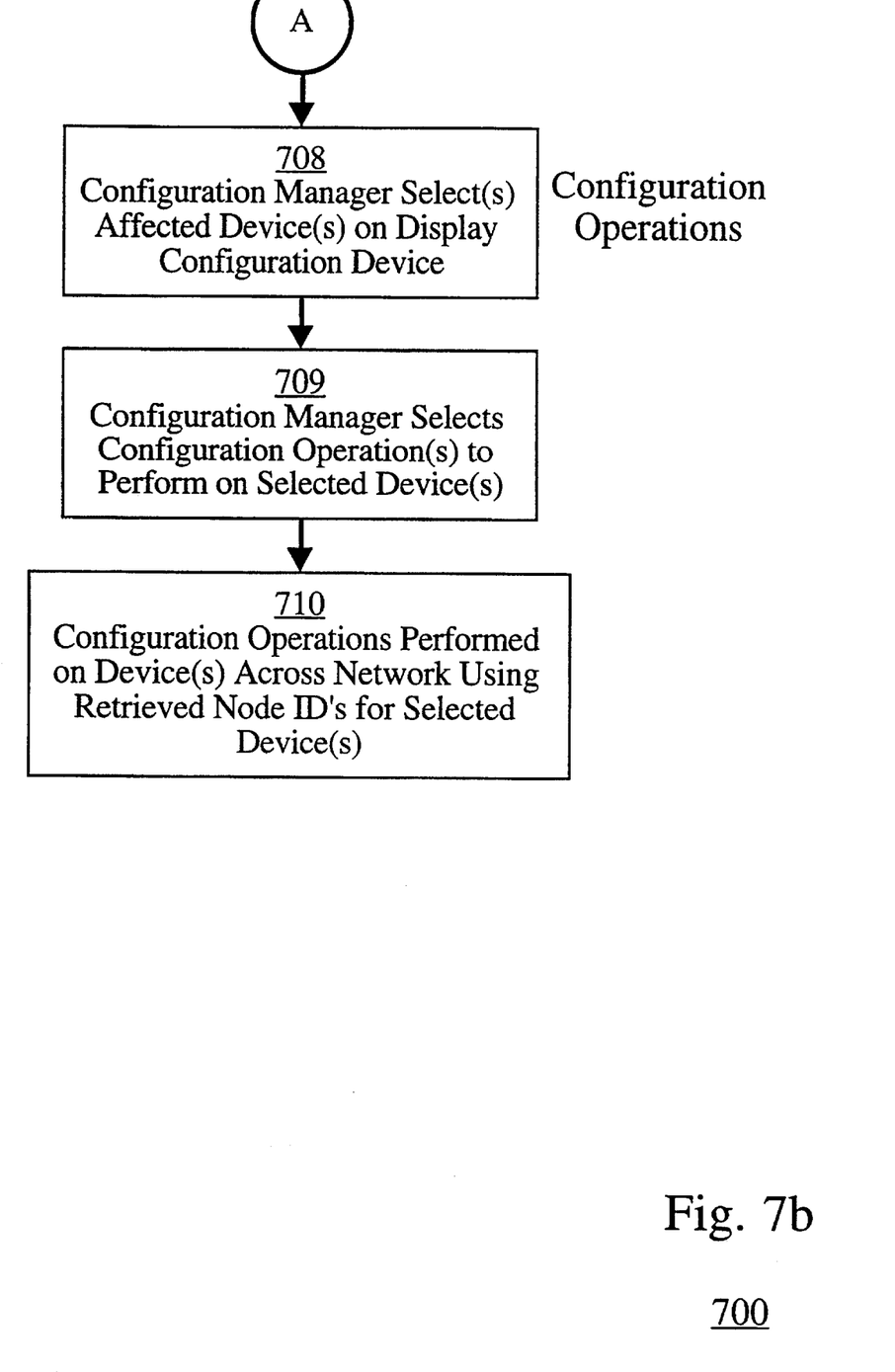

Process 700 commences at step 701 on FIG. 7a wherein at installation time of the physical unit at its fixed location, typically in a wall, or other inaccessible location in an automated house, the installer will obtain a unique ID for the network intelligent cell on a physical medium, such as an adhesive-backed label or other medium capable of retaining the unique ID for the network's cell. This may be done in any number of ways, as discussed above, either by prepackaging the network cell to be coupled to the device with the labeling containing the unique ID, or alternatively, using a configuration tool such as that capable of transmitting the "LON_NM_Query_ID" command to the device. The device then responds with its unique ID. Using a hard copy output device, such as a printer or other hard copy device as is commercially available, the automatic configuration device may print out the unique ID on a hard-copy medium (e.g., an adhesive-backed label). Then, at step 702, during installation of the device and after obtaining its unique ID, the installer can affix the medium to a hard copy floor plan of the automated house, at the physical location on the floor plan where the node and its associated device under its control, resides in the system. Thus, if the installer is installing a network cell which controls a light fixture for example 104 in FIG. 1, then the installer would obtain the unique ID for the network intelligent cell controlling the light on a hard copy medium, and the medium will be affixed to a floor plan representative of the position of the light 104 in the structure. This can then be used later by the configuration manager of the network for performing configuration operations, as will be summarized below. Then, upon affixing the medium to the hard copy floor plan, the installer would then proceed to perform normal installation of the node in its physical location at step 703. Upon completion of physical installation of all nodes in the automated house, the installer retains the floor plan of the network along with the associated bar-code labels affixed at each of the positions on the floor plan in order to indicate physical positions of nodes in the network. This is then used by the configuration manager to assign unique node ID's, and perform configuration operations at step 704.

Upon obtaining the paper floor plan from the installer, the configuration manager activates the automatic configuration device, such as a workstation or personal computer activating a configuration process on the device in order to associate the unique ID's with physical locations in the network. Then, at step 706 assignment of locations with unique ID's obtained by the nodes on a computer-displayed floor plan of the network is performed, similar to the paper floor plan used by the installer. At this time, the configuration manager can select, via a text or graphical user interface (GUI), physical locations in the computer-displayed version of the floor plan, and automatically read in each unique node ID from the paper floor plan using an automatic input device (e.g., bar-code or magnetic reader). Then node ID's are associated with positions on the display of the configuration device such as X, Y location, object ID or other method of associating unique numbers with locations on a display screen. This is performed at step 707. Any variety of ways to associate location on a computer system with a unique value, such as a node ID for identifying a network intelligent cell and associated device under its control, may be used for implementing this particular step.

Upon association of all node ID's in the network with locations on the configuration device's display, then the configuration process may be used for performing configuration operations of nodes in the network, via a point and click interface. For example, at step 708, the configuration manager can select affected device(s) on a display of the configuration device, in order to indicate those nodes which will be affected by the configuration operations. Then, the configuration manager can select any configuration operation(s) to perform on the selected device(s) at step 709. This can be performed using a well known pull-down menu or other item using any commercially available GUI in a computer system. Then, at step 710, using the selected operations and selected node ID's, configuration operations may be performed on the selected devices across the network by using the retrieved unique node ID's from the devices and issuing commands for such operations to the selected device(s) over the networking medium (e.g. 110 of FIG. 1) from the configuration device.

For example, as described above, the commands LON_NM_UPDATE_DOMAIN and LON_NM_ADD_ADDR may be used for causing the unique node ID to be used to join or change a domain for a configured cell or become a member of a group via updates to the address table in the devices. As described above, several types of addresses may be assigned via configuration operations, and appropriate commands being directed to individual nodes using their unique node ID's.

As also described above, other configuration operations such as grouping operations for control of specific devices in the network are available. For example, using the aforementioned grouping operations, certain devices may be configured as "announcers" on the network, and other devices may be configured as "listeners." For example, the user may select each of the displayed icons for a bank of lights (e.g., 610 of FIG. 6) configure those device(s) as "listeners," and a light switch in the smart house would be configured as a "announcer" (e.g., 613 of FIG. 6). The configuration device would then proceed to obtain the unique node ID's for each of the bank of lights 610 (via retrieval from an internal store associated with the selected device(s) on the display, and group those with the unique node ID for the switch 613. In this way, grouping operations as are described in Markkula may be used to allow the control of pre-selected devices (e.g., lights 610) to be controlled by specific switches (e.g., switch 613). Any number of configuration operations, as are used in prior art networking systems, or as in the network intelligent cell described in Markkula, may be used to configure individual nodes in the network.

Thus, the present invention has particular advantage in that the reliance upon manual entry of node ID's in a configuration device by a configuration manager, and the obtaining of unique node ID's from nodes prior to installation in an automated house environment, greatly simplifies and automates the configuration process over those techniques used in the prior art. Thus, implemented embodiments of the present invention have particular advantage over prior art methods of configuration, especially in these types of exemplary applications.

Thus, an invention for the configuring and assigning of addresses and configuring a local operating network has been described. Although the present invention has been described particularly with reference to FIGS. 1–7b, it will be apparent to one skilled in the art, that the present invention has utility far exceeding that disclosed in the figures. It is contemplated that many changes and modifications may be made, by one of ordinary skill in the art, without departing from the spirit and scope of the invention, as disclosed above.

What is claimed is:

1. A method of installing and configuring devices in an automated environment, said devices including network intelligent cells for controlling said devices and communicating with other devices in said automated environment, comprising the following steps:

a. generating for each device, a node identification (ID) code in an automatically-readable format on a medium;

b. affixing each medium that contains a node ID code for a device on a floor plan representation of said automated environment at a location that represents a physical position where said device will be installed;

c. installing said devices in said automated environment at said physical positions and coupling said devices together in said automated environment via a communication medium;

d. using an automatic configuration device which is coupled to said communication medium in said automated environment, automatically reading each said node ID code for each said device, and associating said node ID code with a position on a display screen of said automatic configuration device representing a physical position of said device in said automated environment corresponding with the location that represents the physical position of said device on said floor plan representation;

e. using said automatic configuration device to select individual of said devices on said display screen to obtain said node IDs of said selected devices in order to perform configuration operations; and f. using said automatic configuration device to issue configuration commands for said selected devices by issuing configuration signals in conjunction with said node IDs of said selected devices over said communication medium, and said devices performing configuration operations responsive to said configuration commands.

2. The method of claim 1 wherein each of said network intelligent cells comprises a processor, memory coupled to said processor, a communication circuit coupled to said processor for coupling with said communication medium and communicating with other of said network intelligent cells, and a control circuit coupled to said processor for controlling said device which comprises said network intelligent cell.

3. The method of claim 2 wherein each of said network intelligent cells further comprises a configuration circuit which receives said configuration signals and performs said configuration operations responsive thereto.

4. The method of claim 1 wherein said step of generating said node ID codes in an automatically-readable format on a medium comprises coupling an installation device to each said device, querying said device to provide a node ID code responsive to said query, and printing said node ID code on a medium in a format capable of being automatically read by said automatic configuration device.

5. The method of claim 1 wherein said format capable of being automatically read by said automatic configuration device comprises a bar code format and said medium comprises an adhesive-backed label.

6. The method of claim 1 wherein said format capable of being automatically read by said automatic configuration device comprises a magnetic code and said medium comprises magnetic tape.

7. The method of claim 1 wherein said configuration operations include grouping said devices in said automated environment.

8. The method of claim 7 wherein said configuration operation of grouping said devices in said automated environment comprises configuring a first device as an announcer and a second device as a listener, wherein signals generated by said first device are directed at said second device in said automated environment for communicating and interacting with said second device.

9. The method of claim 1 wherein said configuration operations include assigning devices in said automated environment to network addresses.

10. The method of claim 1 wherein said configuration operations include assigning devices in said automated environment to domains.

11. A method of installing and configuring devices in a networking system, wherein said devices are to be installed at fixed locations in said networking system, said devices including network circuitry for controlling said devices and for communicating with other devices in said networking system, comprising the following steps:

a. generating a unique node identification (ID) code in an automatically-readable format on a medium for each of said devices;

b. affixing the medium for each device of said devices on a floor plan representation of said networking system at a location that represents a physical position where said device will be fixedly installed;

c. installing said devices in said networking system at said physical positions and coupling said devices together in said networking system via a communication medium;

d. using an automatic configuration device coupled to said communication medium in said networking system, automatically reading each said node ID code for each said device, and associating said node ID code with a position on a display screen of said automatic configuration device representing the physical position of said device in said networking system corresponding with the location that represents the physical position of said device on said floor plan representation;

e. using said automatic configuration device to select individual of said devices on said display screen to obtain said node IDs of said selected devices in order to perform configuration operations; and f. using said automatic configuration device to issue configuration commands for said selected devices by issuing configuration signals in conjunction with said node IDs of said selected devices over said communication medium, and said devices performing configuration operations responsive to said configuration commands.

12. The method of claim 11 wherein said network circuitry includes network intelligent cells, wherein each of said network intelligent cells comprises a processor, memory coupled to said processor, communication circuit coupled to said processor for coupling with said communication medium and communicating with other of said network intelligent cells, and control circuit coupled to said processor for controlling said device which comprises said network intelligent cell.

13. The method of claim 12 wherein each of said network intelligent cells further comprises a configuration circuit which receives said configuration signals and performs said configuration operations responsive thereto.

14. The method of claim 11 further including a step of obtaining unique node identification (ID) codes from said devices, wherein the steps of obtaining unique node ID codes and generating said node ID codes in an automatically-readable format on a medium comprise the steps of coupling an installation device to each said device, querying said device to provide a node ID code responsive to said query, and printing said node ID code on a medium in a format capable of being automatically read by said automatic configuration device.

15. The method of claim 11 wherein said format capable of being automatically read by said automatic configuration device comprises a bar code format and said medium comprises an adhesive-backed label.

16. The method of claim 11 wherein said format capable of being automatically read by said automatic configuration device comprises a magnetic code and said medium comprises magnetic tape.

17. The method of claim 11 wherein said configuration operations include grouping said devices in said networking system.

18. The method of claim 17 wherein said configuration operation of grouping said devices in said networking system comprises configuring a first device as an announcer and a second device as a listener, wherein signals generated by said first device are directed at said second device in said networking system for communicating and interacting with said second device.

19. The method of claim 11 wherein said configuration operations include assigning devices in said networking system to network addresses.

20. The method of claim 11 wherein said configuration operations include assigning devices in said networking system to domains.

21. A configuration device for use in a networking system wherein network devices are physically installed in fixed locations, and said network devices include a circuit for communicating with other said network devices in said networking system via unique identifiers, and for performing operations responsive to detection of commands in said networking system containing said unique identifier for one said network device, comprising:

a. a networking interface for coupling said configuration device to said networking system, and allowing said configuration device to communicate with said network devices in said networking system;

b. a display for displaying a representation of said network devices installed at said fixed locations to a user of said configuration device;

c. a selection device for allowing a user to select positions on said display representative of said fixed locations of said network devices;

d. an automatic input device for reading numeric codes representing said unique identifiers of each of said network devices in said networking system, wherein said numeric codes are represented on a medium capable of being read by said automatic input device;

e. a configuration circuit coupled to said networking interface, said display, said selection device, and said automatic input device, for:

i. allowing a user to select positions on said representation that correspond to said fixed locations of a set of said network devices in said networking system;

ii. automatically reading said numeric unique identifiers of said set of said network devices subsequent to said selection using said automatic input device; and      iii. issuing configuration commands responsive to user interaction using said unique identifiers of said set of said network devices via said networking interface in order to configure said set of said network devices in said networking system.

22. The configuration device of claim 21 wherein said format capable of being automatically read by said configuration device comprises a bar code format and said medium comprises an adhesive-backed label.

23. The configuration device of claim 21 wherein said format capable of being automatically read by said configuration device comprises a magnetic code and said medium comprises magnetic tape.

24. The configuration device of claim 21 wherein said configuration operations include grouping said network devices in said networking system.

25. The configuration device of claim 24 wherein said configuration operation of grouping said network devices in said networking system comprises configuring a first device as an announcer and a second device as a listener, wherein signals generated by said first device are directed at said second device in said networking system for communicating and interacting with said second device.

26. The configuration device of claim 21 wherein said configuration operations include assigning said network devices in said networking system to network addresses.

27. The configuration device of claim 21 wherein said configuration operations include assigning said network devices in said networking system to domains.

\* \* \* \* \*